(12) United States Patent
Yefremenko et al.

(10) Patent No.: US 7,274,019 B2
(45) Date of Patent: Sep. 25, 2007

(54) METHOD FOR DETECTION AND IMAGING OVER A BROAD SPECTRAL RANGE

(75) Inventors: Volodymyr Yefremenko, Westmont, IL (US); Eduard Gordiyenko, Westmont, IL (US); Vitalii Pishko, deceased, late of Westmont, IL (US); by Olga Pishko, legal representative, Kharkov (UA); Valentyn Novosad, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 94 days.

(21) Appl. No.: 11/190,784

(22) Filed: Jul. 27, 2005

(65) Prior Publication Data

US 2006/0058196 A1    Mar. 16, 2006

Related U.S. Application Data

(60) Provisional application No. 60/593,003, filed on Jul. 30, 2004.

(51) Int. Cl.
  *H01L 27/18* (2006.01)
(52) U.S. Cl. .................................. 250/336.2
(58) Field of Classification Search ............. 250/336.2
  See application file for complete search history.

(56) References Cited

U.S. PATENT DOCUMENTS 5,538,941 A * 7/1996 Findikoglu et al. ......... 505/210
5,553,036 A * 9/1996 Takemura ................. 369/13.01
2003/0175624 A1* 9/2003 Nozaki et al. ............... 430/296
2005/0123674 A1* 6/2005 Stasiak et al. ................ 427/62

FOREIGN PATENT DOCUMENTS

DE         19511982 A1 * 10/1996

OTHER PUBLICATIONS

J. Appl. Phys. 74 (6), 4251-63, S. Verghese et al., Sensitive Bolometers Using high Tc Superconducting Thermometers for Wavelengths 20-300 um, Sep. 1993.

(Continued)

*Primary Examiner*—David Porta
*Assistant Examiner*—Mindy Vu
(74) *Attorney, Agent, or Firm*—Olson & Hierl, Ltd.; Harry M. Levy (57) ABSTRACT

A method of controlling the coordinate sensitivity in a superconducting microbolometer employs localized light, heating or magnetic field effects to form normal or mixed state regions on a superconducting film and to control the spatial location. Electron beam lithography and wet chemical etching were applied as pattern transfer processes in epitaxial Y—Ba—Cu—O films. Two different sensor designs were tested: (i) a 3 millimeter long and 40 micrometer wide stripe and (ii) a 1.25 millimeters long, and 50 micron wide meandering-like structure. Scanning the laser beam along the stripe leads to physical displacement of the sensitive area, and, therefore, may be used as a basis for imaging over a broad spectral range. Forming the superconducting film as a meandering structure provides the equivalent of a two-dimensional detector array. Advantages of this approach are simplicity of detector fabrication, and simplicity of the read-out process requiring only two electrical terminals.

25 Claims, 5 Drawing Sheets

OTHER PUBLICATIONS

J. Appl. Phys. 76, 1-24, Jul. 1, 1994, P.L. Richards, Bolometers for Infrared and Millimeter Waves.

IEEE Transactions on Applied Superconductivity, vol. 9, No. 2, Jun. 1999, M.J.M.E. DeNivelle et al., High Tc Bolometers with Silicon-Nitride Spiderweb Suspension . . . .

Physica C 329 (2000) 69-74, B. Lakew et al., High Tc Superconducting Bolometer on Chemically-Etched 7 um Thick Sapphire.

Appl. Phys. Lett. 69 (14), Sep. 30, 1996, S.J. Berkowitz, Low Noise High Temperature Superconducting Bolometers for Infrared Imaging.

IEEE Trans. Appl. Superconductivity, vol. 3, No. 1, Mar. 1993, YBa2Cu3O7 Superconductor Microbolometer Arrays Fabricated by . . . , B.R. Johnson et al.

Infrared Physics & Technology 38 (1997) 13-16, Infrared Radiation Detector Linear Arrays of High Tc Superconducting Thin Films, Z. Mai et al.

IEEE Trans. Appl. Superconductivity, vol. 7, No. 2, Jun. 1997, 2371-2373, High Tc $GdBa_2Cu_3O_{7-8}$Superconducting Thi Film Bolometers, Li et al.

IEEE Tarns. Appl. Superconductivity, vol. 13, No. 2, Jun. 2003, 176-179, J. Delerue et al., YBCO Mid-Infrared Bolometer Arrays.

J. Appl. Phys. 68 (11), Dec. 1, 1990, 5409-5414., Grossman et al., Two-Dimensional Analysis of Microbolometer Arrays.

IEEE Trans. Appl. Superconductivity, vol. 11, No. 1, Mar. 2001, YBaCuO Mid Infrared Bolometers: Substrate Influence on Inter-Pixel Crosstalk, A. Gaugue et al.

IEEE Trans. Appl. Superconductivity, vol. 7, No. 2, Jun. 1997, Voltage-Biased High Tc Superconducting Infrared Bolometers with Strong Electrothermal Feedback, A.T.Lee et al.

Supercond. Sc. Technol. 13 (2000) 1235-1245, Recent Progress in High Temperature Superconductor Bolometric Detectors . . . A.J. Kreisler et al.

\* cited by examiner

A) E - beam resist spin coating

B) E - beam patterning

C) Resist development

D) Wet chemistry etching

E) Resist removal

METHOD FOR DETECTION AND IMAGING OVER A BROAD SPECTRAL RANGE

CROSS REFERENCE TO RELATED APPLICATION

This application claims the benefit of U.S. Provisional Application No. 60/593,003 filed on Jul. 30, 2004.

The United States Government has rights in this invention pursuant to Contract No. W-31-109-ENG-38 between the U.S. Department of Energy and The University of Chicago representing Argonne National Laboratory.

FIELD OF THE INVENTION

This invention relates generally to an improved method and arrangement for detection and imaging over a broad spectral range and is particularly directed to the use of a superconducting film subject to localized, pin-point heating at the critical temperature, $T_c$, by a laser, magnetic field, micro-heaters, etc.

BACKGROUND OF THE INVENTION

The sensitivity of transition edge superconducting (TES) detectors can be comparable to the best liquid nitrogen cooled semiconducting infrared detectors, but with a much larger detection range extending to long wavelengths. Extensive efforts have been directed to realize TES detector arrays. The multistep detector fabrication process, inter-pixel crosstalk and sophisticated read-out schemes are common problems in this area of research. Both current and voltage biased detectors have been considered. However, the traditionally accepted approach to detector design suggests a discrete pixel organization with electronic signal commutation. We propose another method for the registration of the spatial distribution of the thermal radiation intensity. It is based on the idea that localized heating or magnetic fields may be used to create normal, superconducting or transition resistive states and to control their spatial location on the surface. In the present invention, a laser beam, precisely focused on the strip, is used to nucleate the resistive area sensitive to external thermal effects. By displacing the laser beam along the strip we obtain the voltage signal modulated by the temperature distribution due to the external side effects.

OBJECTS AND SUMMARY OF THE INVENTION

This invention represents a departure from traditional detectors of the Focal Plane Array (FPA) design by employing an approach wherein the coordinate sensitivity of a microfabricated superconducting strip is controlled by scanning a beam of energy, such as from a laser or an LCD or in the form of a magnetic field, over the superconducting detector strip so as to physically displace the sensitive area of the detector to permit imaging over a broad spectral range. The superconducting detector strip may either be linear or curvilinear, with the latter equivalent to a two dimensional detector array. In addition to the simplicity of the detector fabrication sequence (one step mask transfer), a clear advantage of this invention is the simplicity of the read-out process: an image is formed by registering the signal with only two electrical terminals. The inventive approach can be extended for imaging over a wide spectral range; the limiting factor being the wavelength-dependent efficiency of thermal conversion in the film/substrate system.

Accordingly, it is an object of the present invention to provide a high resolution, high sensitivity method and apparatus for detection of radiation over a broad band spectrum.

It is another object of the present invention to provide a method and apparatus for detection and imaging of thermal radiation over a broad wavelength range, i.e., 1 µm-1000 µm, which is commercially feasible and of relatively low cost.

A further object of the present invention is to control the coordinate sensitivity in a superconducting microbolometer by the application of localized light or magnetic field energy to the detector, or by the use of lithographically defined arrays of micro-heaters in the detector, to simplify the read-out mechanism.

Yet another object of the present invention is to scan over a superconducting film a source of energy precisely focused on the surface of the film for rendering the film superconducting at that location for detecting absorbed radiation incident on the film and providing a high resolution video image of the radiation source over a given spectral range.

The present invention is a method of controlling the sensitivity of specific coordinates of a low or high temperature superconducting sensor which provides an IR sensor with broad spectral range sensitivity at relatively low cost. This method can also be applied to control the sensitivity of microbolometers made of other materials that demonstrate sharp dependence of their electrical resistance on temperature or other factors such as magnetic field, etc. Superconducting (SC) films have already been used for various x-ray, infrared, THz, millimeter and microwave applications. Superconducting transition edge sensors have been used as calorimeters and thermistors. The unique property of SC materials is the possibility of utilizing the superconducting, resistive and magnetically ordered phases in the same substance. The type of phases depends on the fabrication methods, and on external effects. SC materials show best performance (with respect to thermal effects) for detection purposes when operating at the critical temperature ($T_c$), the temperature at which the material becomes superconducting. In this region, even small variations in temperature lead to substantial changes in electrical resistance.

As an example, we explain the principle of this invention for the case of detection of infrared radiation. However, this same approach can be used for imaging over a broad spectral range (from x-ray to millimeter wavelength). The present invention employs the external action of an optical probe, thermal heating or magnetic field to create normal, superconducting or resistive areas and control their location on the film surface. In other words, once the temperature of the SC film reaches $T_c$, small changes in the temperature of the film will create large measurable changes in the resistance of the film. Therefore, the invention consists of a superconducting film which may be in the form of a linear or curvilinear strip or a raster-type structure. The image to be detected is optically focused on the surface of the film. The effect of the infrared radiation varies along the strip according to the spatial distribution of the heat source. A laser beam, precisely focused on the SC film is used as an external source of heat to optimally bias the sensor. By adjusting the energy of the laser, the temperature of a specific coordinate on the film can be increased up to $T_c$ to create a local area with optimal response. The laser beam is passed over the film in a raster-like pattern which, when precisely matched with a change in resistance of the film, provides the IR temperature of the image focused on the SC film. Displacement of this resistive (and sensitive to IR radiation) spot along the raster may be used as a basis for a self-scanning image system. Replacement of the strip with a continuous film or curvilinear structure makes two-dimensional imaging possible. In this case, the SC film can include normal, superconducting and transition regions. However, the photo response maximum caused by thermal effects is realized in the transition region. Alternatively, a magnetic field or lithographically defined arrays of micro-heaters or a matrix of light sources (assembly of light emitting diodes, for example) may be used in place of the laser to provide localized, pin-point heating of the SC film. The external action effect can be intensity modulated to increase the signal-to-noise ratio.

A subtraction of the background contribution (taken with a closed shutter) from IR-produced images can be performed to eliminate any influence of possible sensor defects or surface temperature variation.

Proof of principle of the invention has been shown using high temperature Y—Ba—Cu—O superconducting films patterned in one-dimension (1D-strip) and two-dimension (2D-meandering-like) structures.

The proposed system and method can be extended for imaging over a wide spectral range, with the limiting factor being the wavelength-dependent efficiency of thermal conversion in the film/substrate system. Using effective micro antennas integrated in the sensor and/or absorption enhancing coatings permits multi-spectral imaging.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
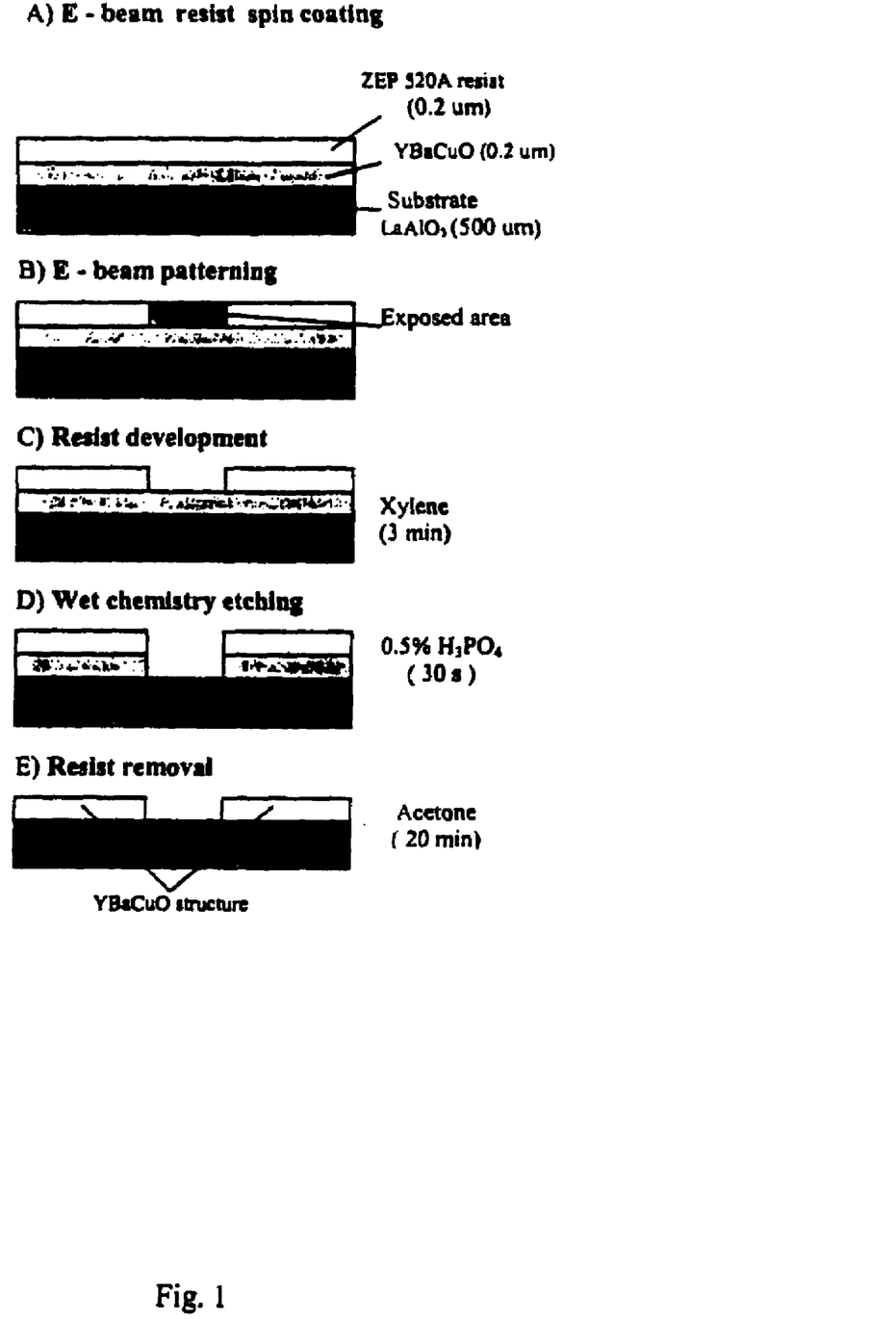
FIG. 1 illustrates the procedure used in the fabrication of the HTSC detector structure used in the present invention.

The detector fabrication sequence is shown in FIG. 1. The HTSC material is a 200 nm thick c-oriented epitaxial Y—Ba—Cu—O (YBCO) film grown on one side of a double-side polished $LaAlO_3$ substrate by laser beam ablation as shown in Step A. The detector geometry is defined by means of electron beam lithography. The thin detector film is spin-coated with a 0.2 μm thick single layer of ZEP-520A resist also applied in Step A. ZEP consists of a copolymer of chloromethscrylate and methalstyrene. ZEP-520A polymer is a high sensitivity e-beam resist of positive tone produced by Nippon Zeon Co. (http://www.zeon.co.ip). All exposures are made with a RAITH—Model 150 electron beam system operating at 30 kV with a beam current of 300 pA as shown in Step B. The baking and post-exposure development of the photoresists is performed in Step C according to supplier recommendations. The 40 micron wide and 3 millimeter long stripe-like pattern was then transferred by wet chemical etching in a 0.5% aqueous $H_3PO_4$ solution in Step D. The ZEP-520A resist was removed in Step E using acetone leaving the exposed Y—Ba—Cu—O structure. Finally, gold contacts for four-probe transport measurements were deposited by magnetron sputtering through a shadow mask in a conventional manner (not shown).

Figure 2:
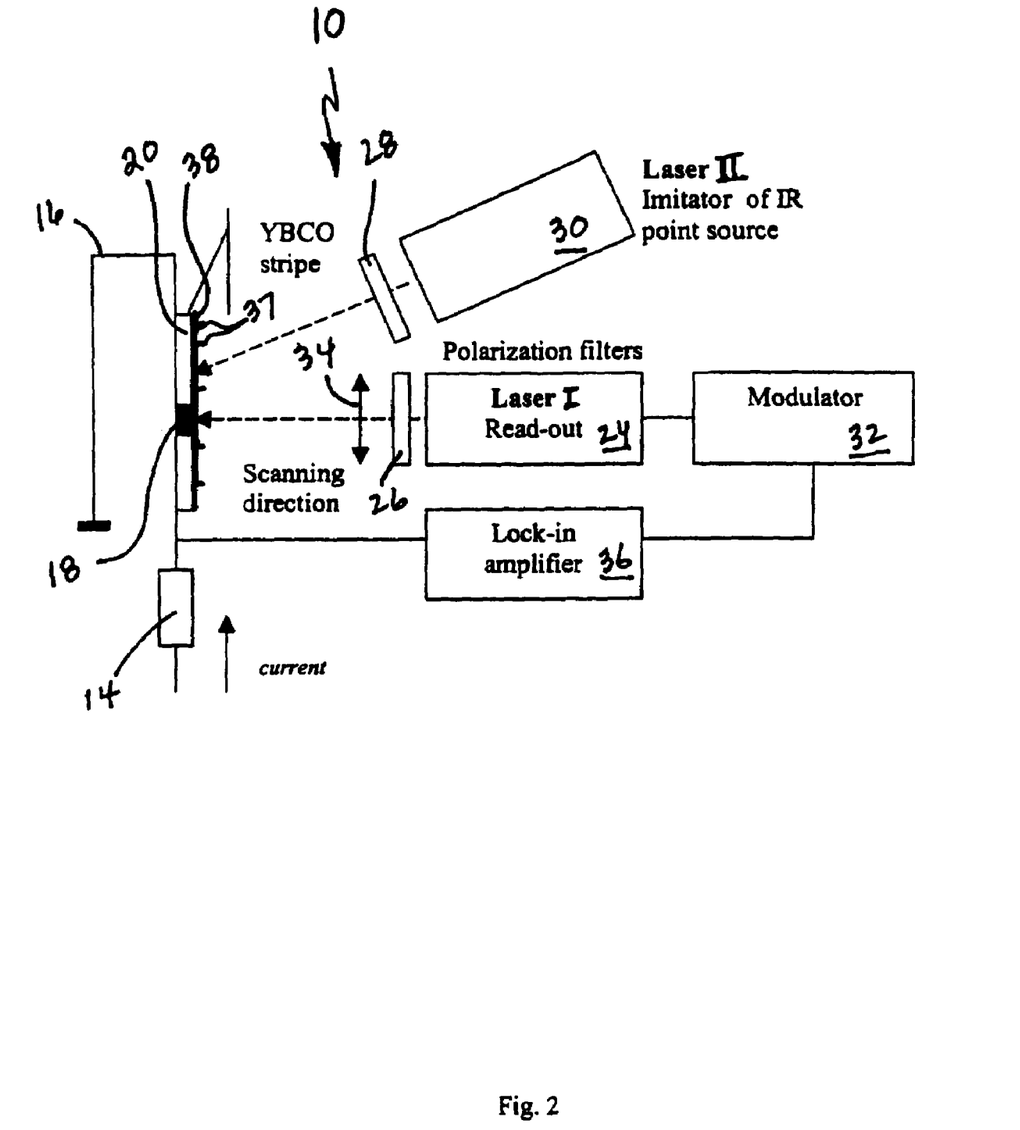
FIG. 2 is a simplified combined schematic and block diagram of a system for carrying out detection and imaging over a broad spectral range in accordance with the present invention.

A simplified block diagram of the inventive IR radiation detection and imaging system 10 is shown in FIG. 2. A sample holder is mounted to the vacuum port of an optical cryostat 16. The temperature is varied from 80 to 95K and is stabilized with an accuracy of ~5 mK. The temperature variable resistivity measurements of "as-grown" films and the microfabricated detector show that the patterning process does not affect transport properties. The zero-resistance temperature $T_c$ is 87.2K, with a transition width of ~0.8K. The local sensitive element 18 (small region of the YBCO strip) is formed by using a 3 mW laser diode (Laser I) 24 operating at 630 nm wavelength. The power of the linearly polarized scanning beam is adjusted using a polarization filter 26. The estimated dimensions of the beam focused on the YBCO strip 20 are 40×10 $\mu m^2$. A micro screw (not shown) with 10 microns per step serves to displace the probe. A second laser (Laser II) 30 with incident power of 0.5 mW is applied to simulate an external point-like source of thermal radiation, the spectral characteristics of which are to be measured. The lasers provide modulated or constant intensity light. The temperature and electrical resistance of the detector in the form of the aforementioned local sensitive element 18 is recorded using a four-probe arrangement. Low noise electronics and a frequency lock-in detection scheme is used to improve the signal-to-noise ratio. The experimental set-up is computer controlled using a GPIB/LabView interface.

Figure 3:
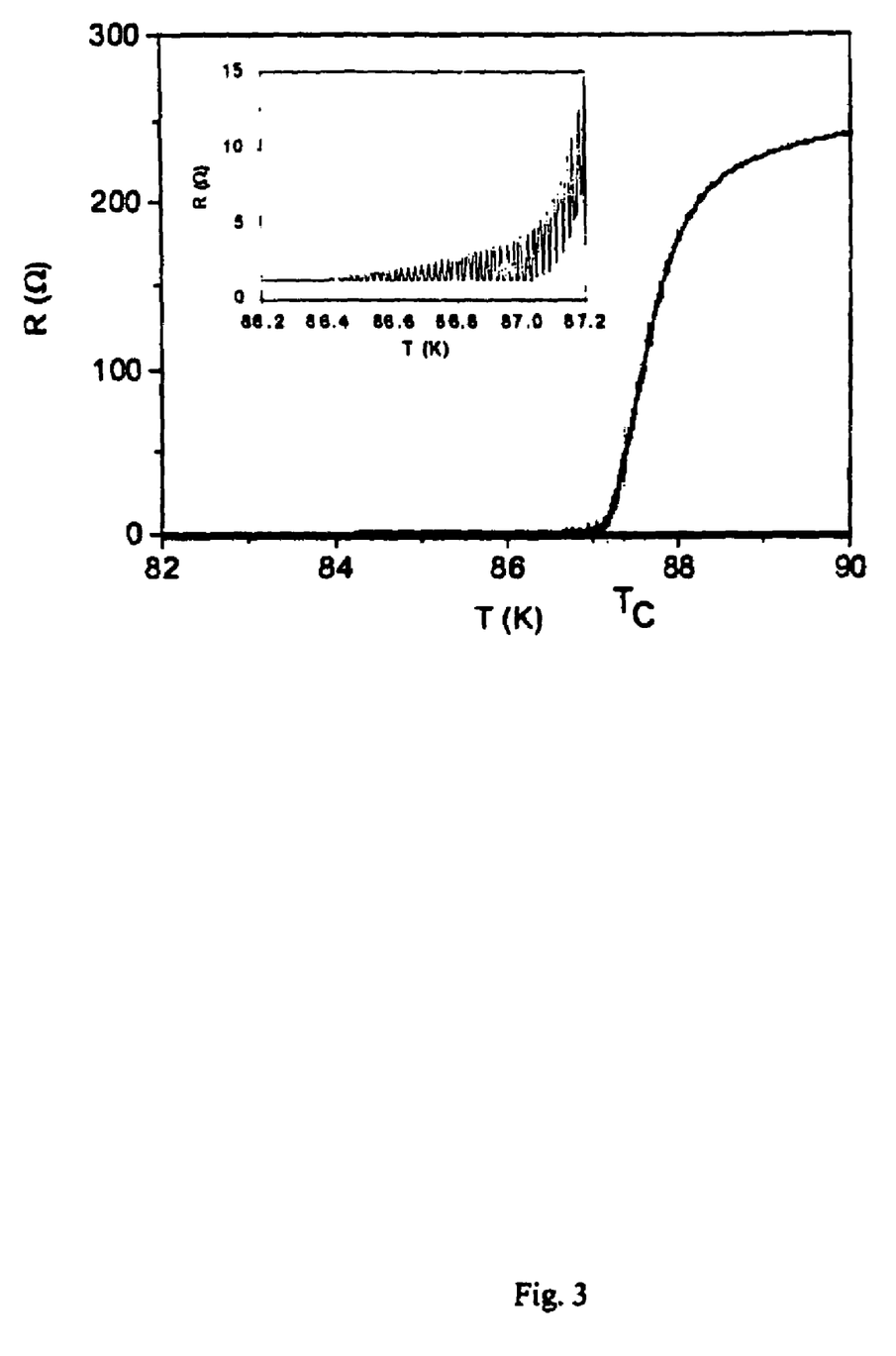
FIG. 3 graphically illustrates the temperature dependence of the resistance of a sample heated by a micro-focused laser beam modulated at 1 Hz, where the insert in the figure shows the appearance of resistivity spikes due to the formation of a sensitive probe area on the sample.

The temperature of the sample, i.e., local sensitive element 18, biased with 1.3 mA current is cycled (cooling-heating) around the superconducting transition temperature $T_c$. The resistance is measured in 20 mK steps under sample illumination with the laser beam provided by laser 24 with intensity modulation at 1 Hz. The results are shown in the graph of FIG. 3, which illustrates the temperature dependence of the resistance of a sample illuminated with a micro-focused laser beam modulated at 1 Hz. The detectable signal appears at 86.3K. As mentioned above, the critical temperature of the sample is 87K, therefore, one can speculate that the focused laser beam produces a local increase in the temperature on the order of ~0.7K. The full resistance of the sample has two contributions: r—the resistance of the illuminated part, and R—the resistance of the rest of the sample. The behavior of the temperature dependence and the magnitude of (R+r) between 86.3-87 K is defined by the superconducting-to-normal state transition in the laser illuminated area only. The unaffected part of the strip has zero R up to 80K. Therefore, only the illuminated area appears to be sensitive to the external infrared radiation effects provided by laser 30 simulating the IR radiation of a body to be measured. The size of this area is determined by the laser probe size, power, duration, and, most importantly, on the substrate and HTSC film properties (absorption, thermal conductivity and specific heat capacity). These dimensions are estimated experimentally by comparing the value of the sample's resistivity $R=R_0 L/S$ and $r=R_0 l/S$ measured with and without the laser beam, where $R_o$ denotes the normalized resistivity, L and l are the linear size of the whole YBCO strip and resistive areas, respectively, and S is the cross-section of the strip. Hereafter, it is assumed that all parts of the sample are identical in terms of chemical composition and defects distribution. This is justified by the fact that the laser beam is much larger than the expected inhomogeneities that can affect the transport properties of the epitaxially grown film. The characteristic resistivity values at the maxima of dR/dT and dr/dT are R=60 Ω for the whole sample (dR/dT=286 Ω/K at 87.36 K) and r=0.92 Ω for the laser illuminated area (dR/dT=4.7 Ω/K at 86.70 K). The linear size l of the sensitive area is therefore determined as $l=(r/R) \times L=46$ µm, where L=3 mm is the strip length. Since the strip width is equal to 40 µm, the lateral dimensions of the sensitive area can be estimated as 46×40 µm. It is clear that such a small area with local sensitivity to infrared radiation can be created at any location along the strip simply by scanning the laser beam over the strip. The estimated sensitive area appears to be larger than the size of the laser beam (10×40 µm$^2$) used to create it, possibly due to some excess heating effect. The insert in FIG. 3 shows the appearance of resistivity spikes due to the formation of the sensitive probe area on the detector strip.

Figure 4:
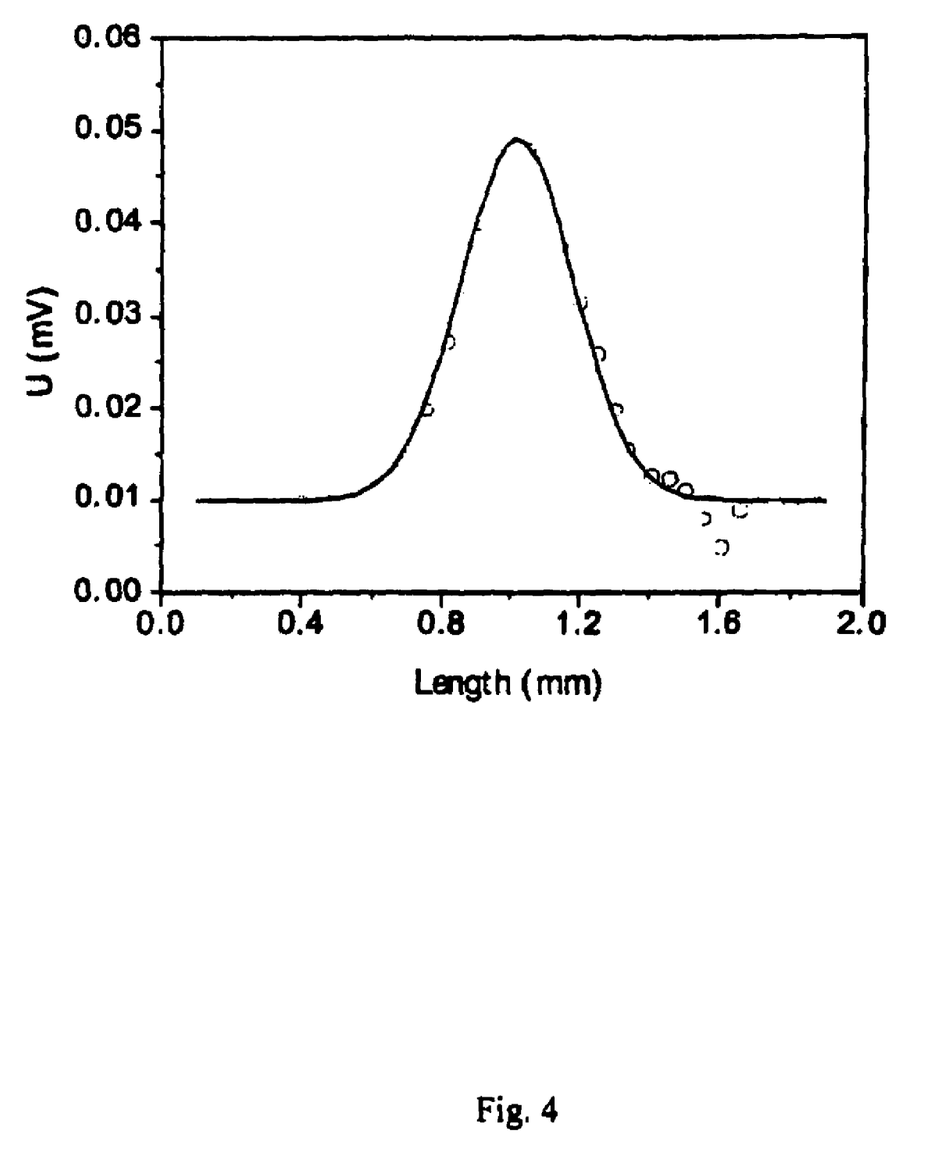
FIG. 4 graphically illustrates a spatially resolved signal that reflects the intensity distribution of an imitated infrared light source.

To demonstrate, a test-experiment was performed where the spatial distribution of the heating effect from an external point-like infrared source was measured. The second laser 30, producing a defocused beam, was used to imitate the thermal radiation of an emitting body. The illuminated portion of the sample's surface has a weak temperature distribution reflecting the heating effect of the second laser 30. The detector temperature was stabilized at 86.7K during the measurements. The light power was set to 0.5 mW to insure retention of the superconducting state of the YBCO strip 20 without local thermal action. The probing laser 24 (Laser I) was mounted on a linear scanner (not shown) that allows for displacement of the beam along the strip in the directions of arrow 34 in FIG. 2. Laser beam intensity was modulated at 10 Hz by modulator 32. The photo-response was detected in lock-in mode using lock-in amplifier 36. The recorded signal is shown with open markers in FIG. 4. The solid line is the fitting of the experiment with a Gaussian function. The estimated half width of the measured profile is ~300 microns, in full agreement with the known beam size of the second laser 30 (Laser II) that was measured separately with an optical microscope. The induced temperature changes δT due to infrared radiation is proportional to the voltage drop in the biased YBCO strip and inversely proportional to the superconducting transition slope and the bias current. In these experiments, wherein infrared light was imitated with a laser beam, δT can be estimated as 6.5 mK.

In summary, the ability to control the coordinate sensitivity in YBCO patterned structures was confirmed experimentally. A locally sensitive 46×40 µm element 18 was positioned along a 3 mm long strip 20. This inventive approach provides a microsensor with submicron dimensions which affords very high dR/dT sensitivity and low thermal conductivity. The imaging method described, by which the coordinate sensitivity of a microfabricated superconducting strip 20 is controlled, is similar to the pixel-by-pixel read-out scheme of a one-dimensional chain of single element infrared detectors. Obviously, the geometrical configuration of the sensor of the present invention can be designed to satisfy more complicated imaging tasks. For example, forming the superconducting film in a curvilinear pattern is equivalent to a two-dimensional detector array. In addition to the simplicity of the detector fabrication process of the present invention (one step mask transfer), another clear advantage of this approach is the simplicity of the read-out process, i.e., an image is formed by registering the signal with two electrical terminals only. The inventive method can be extended for imaging over a wide spectral range, where the limiting factor is the wavelength-dependent efficiency of thermal conversion in the film/substrate system. Incorporating effective micro antennas 37 integrated in the sensor and applying absorption enhancing coatings 38 would further enhance the multi-spectral imaging of the IR radiation detection and imaging system 10 of the present invention for a wide range of applications.

Figure 5:
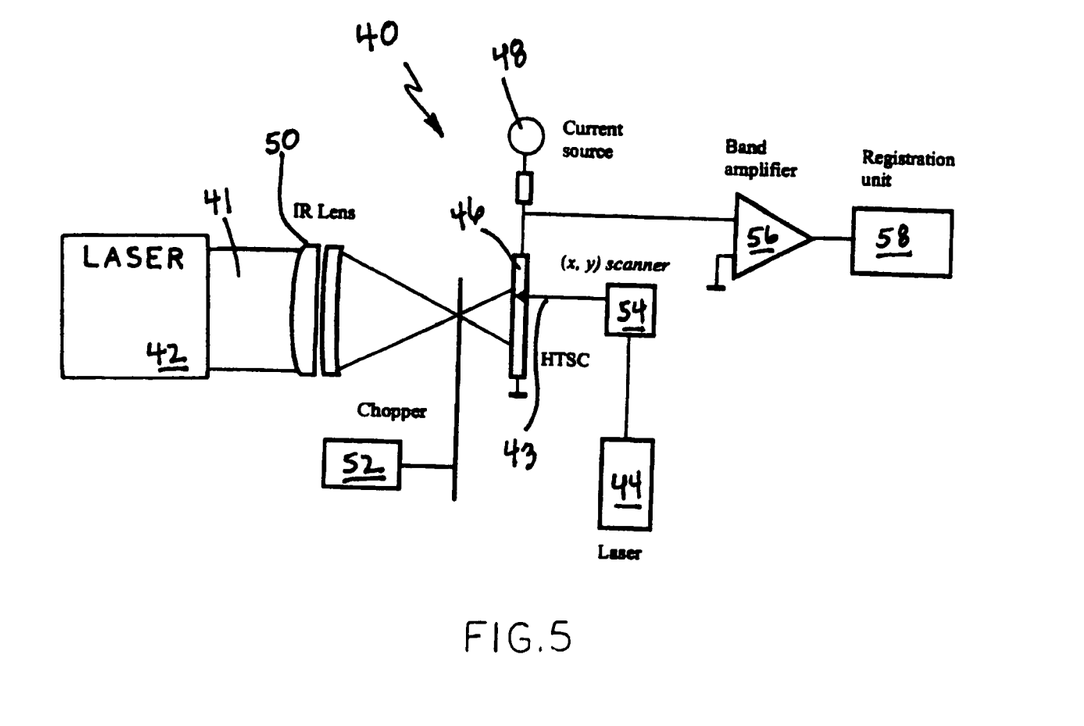
FIG. 5 is a simplified combined schematic and block diagram of an IR radiation detection and imaging system in accordance with another embodiment of the present invention.

Referring to FIG. 5, there is shown a simplified combined schematic and block diagram of an IR radiation and detection system 40 in accordance with another embodiment of the present invention. The IR radiation and detection system 40 includes an HTSC detector 46 as previously described upon which is directed a first laser beam 41. The first laser beam 41 is provided by the combination of a first laser 42 and an IR lens 50 for focusing the first laser beam on the surface of the HTSC detector 46. The first laser beam 41 is directed through a chopper arrangement 52 for modulating the first laser beam. Directed on the opposing surface of the HTSC detector 46, which includes a transparent substrate, is a second laser beam 43 provided by a second laser 44. The second laser 44 is coupled to and displaced by an X,Y scanner 54 to allow for scanning of the second surface of the HTSC detector 46 by the second laser beam 43. X,Y scanner 54 may assume various forms. For example, X,Y scanner 54 may be in the form of one or more moveable mirrors for displacing the second laser beam 43 over the surface of the HTSC detector 46 or the source of the activating light directed onto the HTSC detector 46 may be a matrix of light sources, such as light-emitting diodes (LEDs), which are sequentially activated for moving the plural light beams over the HTSC detector 46 in scanning manner. A current source 48 directs an electric current through the HTSC detector 46, with changes in the resistance of the HTSC detector 46 arising from the second laser beam 43 incident on the detector provided via a band amplifier 56 to a registration unit 58 for detection and recording of these changes. As in the previously described embodiment, the first laser 42 simulates an IR source, the radiation characteristics of which are detected, measured and displayed by the IR radiation and detection system 40.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for detecting radiation emitted, reflected or scattered by an object, said apparatus comprising:

a superconducting structure responsive to an external radiation emitted, reflected or scattered by the object;

an energy source for directing energy onto a small area of said superconducting structure in forming a small localized non-superconducting area on said superconducting structure having an electrical resistance characteristic of the radiation emitted, reflected or scattered by the object;

displacement means coupled to said energy source for scanning said energy over said superconducting structure; and a detector for detecting and recording the electrical resistance characteristic of the small localized non-superconducting area on said superconducting structure as said energy source is scanned over said structure in measuring and recording the spectral characteristics of the object, wherein said detector means detects a change in resistance in the small localized non-superconducting area on said structure arising from the IR radiation emitted, reflected or scattered by the object and incident on the superconducting structure.

2. The apparatus of claim 1 wherein said superconducting structure is comprised of a thin superconducting film grown on a substrate.

3. The apparatus of claim 2 wherein said superconducting film is comprised of Y—Ba—Cu—O and said substrate is comprised of $LaAlO_3$.

4. The apparatus of claim 3 further comprising a layer of ZEP-520A polymer resist disposed on the outer surface of said Y—Ba—Cu—O film.

5. The apparatus of claim 1 wherein said superconducting structure is on the order of 200 µm thick, 40 µm wide and 3 mm long.

6. The apparatus of claim 1 wherein said energy source is a laser for directing a light beam onto said superconducting structure.

7. The apparatus of claim 1 wherein said energy source is a laser diode for directing a laser beam onto the surface of said superconducting structure.

8. The apparatus of claim 7 further comprising a polarization filter disposed inter-mediate said laser diode and said superconducting structure for controlling the power of the laser beam.

9. The apparatus of claim 1 wherein said energy source directs a focused magnetic field onto the surface of said superconducting structure in forming said small localized non-superconducting area on said structure.

10. The apparatus of claim 1 further comprising an electric current source coupled to said superconducting structure for directing a current through said superconducting structure.

11. The apparatus of claim 1 wherein said energy source comprises plural-spaced energy emitters arranged in a matrix array for sequentially directing plural beams on said superconducting structure.

12. The apparatus of claim 11 wherein said displacement means includes an arrangement for sequentially turning on each of said energy emitters and scanning said beams over said superconducting structure.

13. The apparatus of claim 1 further comprising an energy absorption enhancing coating disposed on a surface of said superconducting structure for increasing the spectral range of detection.

14. The apparatus of claim 1 further comprising a micro antenna array disposed on said superconducting structure for increasing the spectral range of detection.

15. A method for measuring IR radiation emitted, reflected or scattered by an object comprising the steps of:

directing radiation from the object onto a superconducting detector having essentially no electrical resistance;

directing energy onto a small area of said superconducting detector so as to render said detector resistive over said small area, wherein the resistance of the irradiated small area of said detector is characteristic of the level of the radiation emitted, reflected or scattered by the object;

displacing the irradiated small area of incident energy over the surface of the superconducting detector; and measuring the resistance of the superconducting detector in the irradiated area as the irradiated area is displaced over the surface of the detector and recording the spectral characteristics of the detected object.

16. The method of claim 15 wherein the step of directing energy onto a small area of said detector includes directing laser light or energy sources onto said detector.

17. The method of claim 15 wherein the step of displacing a small area of incident energy includes scanning light from a laser or other energy source over the surface of said detector.

18. The method of claim 15 wherein the step of displacing the small area of incident energy includes sequentially directing light from plural energy source arranged in a matrix array onto the surface of said detector.

19. The method of claim 15 wherein the step of directing energy onto said detector includes directing a high energy magnetic field onto a small area of said detector.

20. The method of claim 19 further comprising the step of focusing said high energy magnetic field on the surface of said detector.

21. The method of claim 15 further comprising the step of directing an electric current through said detector and measuring a change in resistance in said detector as characteristic of the level of the radiation directed onto said detector.

22. The method of claim 15 further comprising the step of forming said superconducting detector in the shape of an elongated linear strip.

23. The method of claim 15 further comprising the step of forming said superconducting detector in the shape of an elongated curvilinear strip.

24. The method of claim 15 wherein the step of directing energy onto said detector includes sequentially directing energy from plural spaced energy emitters arranged in a matrix array onto a small area of said detector in a moving manner.

25. The method of claim 15 further comprising the step of focusing the radiation emitted, reflected or scattered by the object on the superconducting detector.

* * * * *